(12) United States Patent
Avci (10) Patent No.: US 10,554,579 B2
(45) Date of Patent: Feb. 4, 2020

(54) METHOD AND SYSTEM FOR ALLOCATING RESOURCES TO RESOURCE CONSUMERS IN A CLOUD COMPUTING ENVIRONMENT

(71) Applicant: Sky Atlas Iletisim Sanayi ve Ticaret Anonim Sirketi, Esenler-Istanbul (TR)

(72) Inventor: Murat Avci, Esenler-Istanbul (TR)

(73) Assignee: Sky Atlas Iletisim Sanayi ve Ticaret Anonim Sirketi, Esenler-Istanbul (TR)

( * ) Notice: Subject to any disclaimer, the term of this patent is extended or adjusted under 35 U.S.C. 154(b) by 0 days.

(21) Appl. No.: 15/109,260

(22) PCT Filed: Jan. 2, 2014

(86) PCT No.: PCT/EP2014/050026
§ 371 (c)(1),
(2) Date: Jun. 30, 2016

(87) PCT Pub. No.: WO2015/101419
PCT Pub. Date: Jul. 9, 2015

(65) Prior Publication Data
US 2016/0330137 A1      Nov. 10, 2016

(51) Int. Cl.
*G06F 15/16*       (2006.01)
*H04L 12/911*     (2013.01)

(52) U.S. Cl.
CPC .......... *H04L 47/822* (2013.01); *H04L 47/823* (2013.01)

(58) Field of Classification Search
CPC .... G06F 9/45558; G06F 9/5016; G06F 3/067; G06F 9/5077; G06F 9/5011; G06F 11/3409; G06F 2009/4557; G06F 3/0665; G06F 9/505; G06F 9/5061; G06F 9/5083; G06F 11/3452; G06F 11/3485; G06F 11/3495; G06F 17/30902; G06F 2009/455
See application file for complete search history.

(56) References Cited

U.S. PATENT DOCUMENTS

| | | | | |
|---|---|---|---|---|
| 6,189,022 B1 * | 2/2001 | Binns | ................... | G06F 9/4887 718/100 |
| 6,438,704 B1 * | 8/2002 | Harris | ................... | G06F 9/4881 710/58 |

(Continued)

OTHER PUBLICATIONS

International Search Report and Written Opinion for corresponding Patent Application No. PCT/EP2014/050026 dated Sep. 24, 2014.

(Continued)

*Primary Examiner* — Douglas B Blair
(74) *Attorney, Agent, or Firm* — Renner, Otto, Boisselle & Sklar, LLP (57) ABSTRACT

The present invention concerns a method for allocating at least one resource to a plurality of resource consumers in a cloud computing environment. The method comprises the steps of defining a maximum resource consumption for each of the plurality of resource consumers; measuring a current resource consumption of each of the plurality of resource consumers; calculating based on the maximum resource consumptions and the current resource consumptions an unutilized amount of the at least one resource; and allocating at least a portion of the unutilized amount of the at least one resource to the plurality of resource consumers.

11 Claims, 4 Drawing Sheets

(56) References Cited

U.S. PATENT DOCUMENTS

| | | | | |
|---|---|---|---|---|
| 8,533,103 B1* | 9/2013 | Certain | ................... | G06Q 10/06 705/37 |
| 8,612,330 B1* | 12/2013 | Certain | ................... | G06Q 30/06 705/37 |
| 8,639,595 B1* | 1/2014 | Brooker | ................. | G06Q 20/14 705/30 |
| 8,694,400 B1* | 4/2014 | Certain | ................... | G06Q 30/08 705/35 |
| 9,037,703 B1* | 5/2015 | Wu | ....................... | G06F 9/5027 370/252 |
| 2002/0082856 A1* | 6/2002 | Gray | ......................... | G06F 9/50 718/104 |
| 2005/0052994 A1* | 3/2005 | Lee | ........................ | H04L 47/10 370/230 |
| 2006/0136761 A1* | 6/2006 | Frasier | .................... | G06F 9/505 713/320 |
| 2006/0140115 A1* | 6/2006 | Timus | .................... | H04L 47/10 370/230 |
| 2006/0190482 A1* | 8/2006 | Kishan | ................... | G06F 9/485 |
| 2006/0268967 A1* | 11/2006 | Drezet | ................. | G06F 9/5072 375/224 |
| 2006/0271700 A1* | 11/2006 | Kawai | ................ | H04L 67/1008 709/233 |
| 2008/0022284 A1* | 1/2008 | Cherkasova | .......... | G06F 9/4881 718/104 |
| 2008/0080396 A1* | 4/2008 | Meijer | ................... | H04L 12/66 370/254 |
| 2010/0064043 A1* | 3/2010 | Iino | ......................... | G06F 9/468 709/226 |
| 2011/0314145 A1* | 12/2011 | Raleigh | ............... | H04L 41/0893 709/224 |
| 2012/0099455 A1* | 4/2012 | Morita | .................. | H04W 16/10 370/252 |
| 2012/0266026 A1* | 10/2012 | Chikkalingaiah | ... | G06F 11/0712 714/38.1 |
| 2012/0272243 A1* | 10/2012 | Nolterieke | .......... | G06F 9/45558 718/1 |
| 2012/0303816 A1 | 11/2012 | Kannan et al. | | |
| 2014/0317265 A1* | 10/2014 | James | ................. | H04L 67/1004 709/224 |
| 2014/0359632 A1* | 12/2014 | Kishan | .................. | G06F 9/5038 718/103 |
| 2015/0149501 A1* | 5/2015 | Prakash | ................ | G06F 9/5027 707/769 |

OTHER PUBLICATIONS

Written Opinion for corresponding Patent Application No. PCT/EP2014/050026 dated Nov. 25, 2015.
International Preliminary Report on Patentability for corresponding Patent Application No. PCT/EP2014/050026 dated Apr. 6, 2016.
Zhiming et al.; "CloudScale", Cloud Computing, ACM, New York, NY, Oct. 26, 2011, pp. 1-14, XP058005039.

* cited by examiner

METHOD AND SYSTEM FOR ALLOCATING RESOURCES TO RESOURCE CONSUMERS IN A CLOUD COMPUTING ENVIRONMENT

This application is a national phase of International Application No. PCT/EP2014/050026 filed Jan. 2, 2014 and published in the English language.

TECHNICAL FIELD

The present invention relates to a method for allocating at least one resource to a plurality of resource consumers in a cloud computing environment and a corresponding system.

THE PRIOR ART

Nowadays, complex computations are typically executed by means of a plurality of distributed computer systems which communicate over networks, such as the Internet. This concept of distributed computing refers to "Cloud computing". Importantly, network-based services of the IT infrastructure appear to be provided by real server hardware. In fact the network-based services are instead implemented by virtual hardware or virtual machines and are simulated by software running on real machines (or said distributed computer systems). This way, one software program or application can be run on the plurality of distributed computer systems at the same time, which makes it possible to benefit from the vastly increased processing capabilities offered thereby, as compared to traditional "local processing".

Various commercial cloud-computing environments are already in place, e.g. Amazon EC2 or Google Apps, which allow deploying web services to the Internet, which are then executed on the cloud computing provider's servers. As the skilled person will readily observe, Internet communications and web services generally rely on the concept of "loosely coupled" entities, in which a given request/response cycle is independent of any preceding communication cycles.

Those skilled in the art will appreciate that allocating a resource to resource consumers in a cloud computing environment is a difficult task. Consider a plurality of distributed computer systems which access the network-based services at the same time, such as a database or an application. For example, two resource consumers run the same software application for "flight booking" on two computers. Respective booking operations have to meet the requirements of the software with regard to a resource e.g. CPU server, storage, or hard drive space. In this respect, one resource consumer of the computer system might exploit the respective resource to full extent, while the other resource consumer might not utilize the resource at all. If a resource, such as CPU, is not properly allocated or irrespective of the resource consumers' need and consumption, all resource consumers are affected by severe consequences. Consequences include wasted resource, slow system and its operations (booking) and overbooking. In this scenario, one CPU server is unutilized by one service consumers and is accordingly wasted.

In the prior art the allocation of a resource is not well solved. One way of allocating is to partition the resource (of a server). The resulting partitions are then assigned to the service users (equally referred to as resource consumers). In other words, the resource is allocated based on a uniform distribution or equipartition. For example, a physical resource is statically and uniformly partitioned into virtual machines (VMs) according to the applications' peak demands by using virtualization solutions like Cen, VMWare of KVM. This way, for example, two resources, CPU servers, are equally allocated and shared between two resource consumers, as mentioned above. However, one disadvantage is that one resource consumer can only utilize one CPU server, and one CPU server is vice versa utilized by only one resource consumer. Thereby resources are inefficiently or poorly utilized. This leads to respective drawbacks, including high costs, performance, energy and electricity issues.

A technique, referred to as resource capping is known to improve the overall resource utilization. Said resource capping ensures that no application can consume more resources than those allocated to it. However, the prior art-resource capping runs the problem that a too low resource cap (underestimation) causes SLO violations, whereas a too high resource cap (overestimation) leads to wasted resources.

Document "Cloud Scale: Elastic Resource Scaling for Multi-Tenant Cloud Systems" (SOCC'11, Oct. 27-28, 2011, Cascais, Portugal) discloses a system, Cloud Scale, for fine-grained elastic resource scaling for multi-tenant cloud computing infrastructures. The elastic resource scaling system adjusts the resource cap dynamically based on application resource demands to avoid under-estimation errors. In particular two complementary under-estimation error handling schemes are provided by CloudScale, namely online adaptive padding and reactive error correction. A small extra value (padding value) is added to the predicted resource demand by padding. However, still a too low padding value results in under-estimation errors and a too high padding value causes unnecessary resource waste. The resource cap is raised by multiplying the current resource cap by a ratio $\alpha>1$ until the under-estimation error is corrected. The value of a denotes the tradeoff between the under-estimation correction speed and the resource waste.

However, said handling schemes are still quite static. An extra buffer is added to avoid under-estimation errors and thereby decreases the error rate. The errors are then handled by raising the resource cap. This way, the resources are disadvantageously wasted to a great extent. In the worst case, the sum of the extra value and value of $\alpha$ is wasted. Thus, there is a need for a better utilization of underutilized resources to gain performance. In other words, underutilized resources of resource consumers have to be allocated to resource consumers who are in need.

It is therefore the technical problem underlying the present invention to provide an approach for improved allocation of resources according to the needs and consumption behavior of resource consumers in an efficient and cost effective way that at least partly overcomes the above explained disadvantages of the prior art.

SUMMARY OF THE INVENTION

This problem is according to one aspect of the invention solved by a method for allocating at least one resource to a plurality of resource consumers in a cloud computing environment, wherein the method comprises the following steps:
a. defining a maximum resource consumption for each of the plurality of resource consumers;
b. measuring a current resource consumption of each of the plurality of resource consumers;
c. calculating based on the maximum resource consumptions and the current resource consumptions an unutilized amount of the at least one resource; and d. allocating at least a portion of the unutilized amount of the at least one resource to the plurality of resource consumers.

Accordingly, the embodiment defines a method for enabling a proper allocation of a resource to resource consumers in a cloud computing environment. A predefined maximum resource consumption (equally referred to as cap or upper threshold/boundary) is assigned to each of the resource consumers. Each consumer may have a different predefined maximum resource consumption. This way, the consumption is restricted in a controlled manner for example in accordance with the consumption requirements of the resource consumers, such as respective amount of consumption, duration of consumption and payment. In addition, the current resource consumption is monitored for each of the resource consumers. Importantly, the values, maximum resource consumption and current resource consumption and/or the respective calculated delta thereof are used for determining the unutilized amount of the resource. Contrary to the prior art, the calculation of the unutilized amount ensures that the unutilized resource is not wasted, but maintained for improved and dynamic allocation thereof. More specifically, a portion or all of the unutilized amount of the resource is allocated to the resource consumers, who are in need or utilize more resource. In other words, the resource consumers in need are resource consumers who have higher current resource consumptions compared to their maximum resource consumptions.

In one aspect of the invention, the allocating at least a portion of the unutilized amount of the at least one resource to the plurality of resource consumers is based on a distribution of the maximum resource consumptions of the plurality of resource consumers. Accordingly, each resource consumer has the respective predefined cap. Some resource consumers have higher caps, while others have lower caps. This results in an unequal overall distribution of the caps. The unutilized resource is dynamically partitioned in accordance with said cap distribution. For example, a higher proportion of the unutilized resource is allocated to resource consumers with higher caps. In other words, one allocated portion of the unutilized resource is related to one respective cap value of the resource consumer.

In another aspect of the present invention, the at least one resource is selected from the group comprising: CPU, memory, disk I/O, disk space, network bandwidth and/or network I/O. Accordingly, the resource consumers access the network-based services at the same time, thereby utilizing one or more resources, such as CPU.

In a further aspect of the present invention, the method further comprises the step of defining a minimum resource consumption for each of the plurality of resource consumers. Accordingly, additionally or alternatively to the upper boundary or minimum resource consumption a lower boundary or minimum resource consumption is predefined for controlling and restricting the utilization of each resource consumer.

In another aspect of the present invention, the method further comprises the steps of calculating based on the minimum resource consumption and the current resource consumption of a resource consumer an unutilized amount of the at least one resource; and deallocating at least a portion of the unutilized amount from the resource consumer. Accordingly, in the case that a resource consumer is utilizing less resources as allocated to said consumer, a portion or all of the unutilized amount of the resource is deallocated from the respective resource consumers. The present invention thereby allows for dynamically allocating and/or deallocating resource(s) according to the utilization behavior or status of resource consumers. This way, the resource is not wasted, but optimally exploited and distributed among the resource consumers.

In yet another aspect of the present invention, the method further comprises the steps of defining a maximum resource consumption time and a minimum resource consumption time for each of the plurality of resource consumers and measuring a current resource consumption time of each of the plurality of resource consumers. Accordingly, resource consumers show different consumption behaviors, as previously mentioned, including the resource consumption. The cap or maximum and minimum resource consumptions can be considered as boundaries for the amount of resource consumption or degree of utilization. Additionally or alternatively the duration of the resource consumption is of importance and is restricted by maximum and minimum resource consumption times. Referring to the above, two resource consumers are running the flight booking application, thereby utilizing more or less resource, CPU, and over a longer or shorter time.

In a further aspect, the method further comprises the step of increasing the maximum resource consumption of at least one resource consumer, if the current resource consumption of the at least one resource consumer exceeds the maximum resource consumption of the at least one resource consumer longer than the maximum resource consumption time of the at least one resource consumer. Accordingly, the consumption behavior of the resource consumers is monitored. If it is determined, that a consumer utilizes more resource than assigned over a longer time period, one or more resource consumption boundaries are dynamically adapted to the changed behavior. More specifically, in this first case, if the current resource consumption is higher than the maximum resource consumption too long, the maximum resource consumption is increased.

In a further aspect, the method further comprises the step of decreasing the minimum resource consumption of at least one resource consumer, if the current resource consumption of the at least one resource consumer falls below the minimum resource consumption of the at least one resource consumer longer than the minimum resource consumption time of the at least one resource consumer. In the second opposite case, if the current resource consumption is lower than the minimum resource consumption too long, the minimum resource consumption is decreased.

Furthermore, the present invention also provides a computer program comprising instructions for implementing any of the above-described methods.

The invention is also directed to a system for allocating at least one resource to a plurality of resource consumers in a cloud computing environment, wherein the system comprises:

a. means for defining a maximum resource consumption for each of the plurality of resource consumers;
b. means for measuring a current resource consumption of each of the plurality of resource consumers;
c. means for calculating based on the maximum resource consumptions and the current resource consumptions an unutilized amount of the at least one resource; and
d. means for allocating at least a portion of the unutilized amount of the at least one resource to the plurality of resource consumers.

Accordingly, the provided system is generally adapted for dynamically allocating at least one resource to a plurality of resource consumers, as explained in connection with any of the above methods.

Further aspects of the system of the invention are defined in the appended claims.

SHORT DESCRIPTION OF THE DRAWINGS

In the following detailed description, presently preferred embodiments of the invention are further described with reference to the following figures.

DETAILED DESCRIPTION

Figure 1:
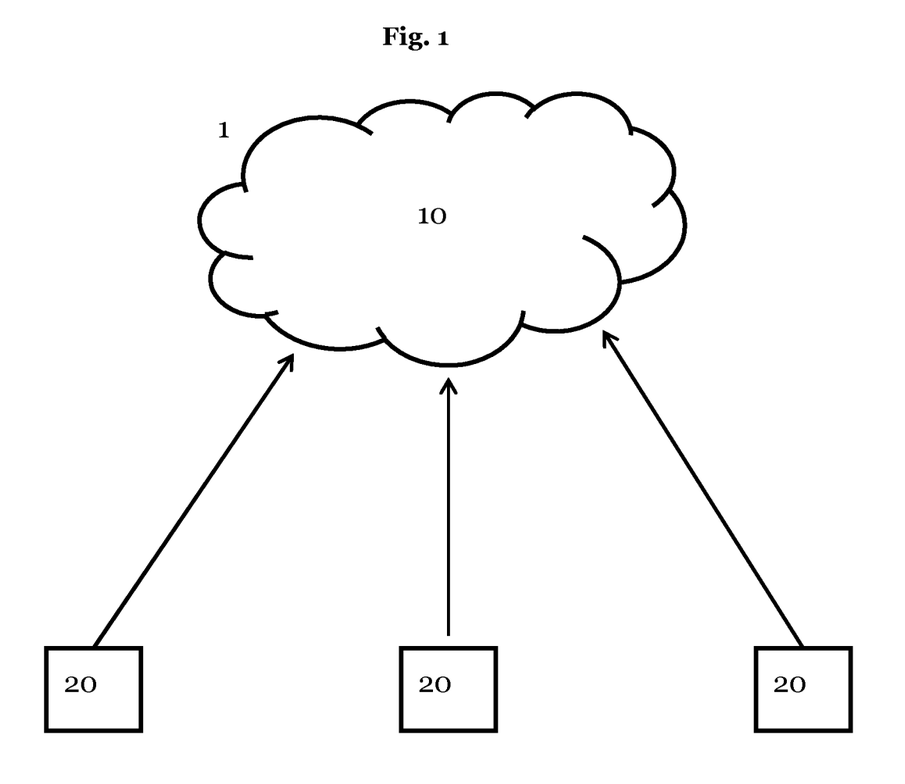
FIG. 1: A schematic overview of resource consumers sharing a resource in a cloud computing environment in accordance with an embodiment of the present invention.

In the following, a presently preferred embodiment of the invention is described with respect to FIG. 1. As can be seen, a plurality of resource consumers 20 access network-based services at the same time over a network, such as the internet, and share a common resource 10, in a cloud computing environment 1. As mentioned in the introduction, the autonomous and fault tolerant cloud environment 1 handles problems within its core components by itself. Virtual machines are efficiently run with resources 10, such as dynamic CPU, memory, disk capacity, I/O rate and bandwidth allocation based on the current consumption of those resources 10.

Resource Allocating/Deallocating

Figure 2:
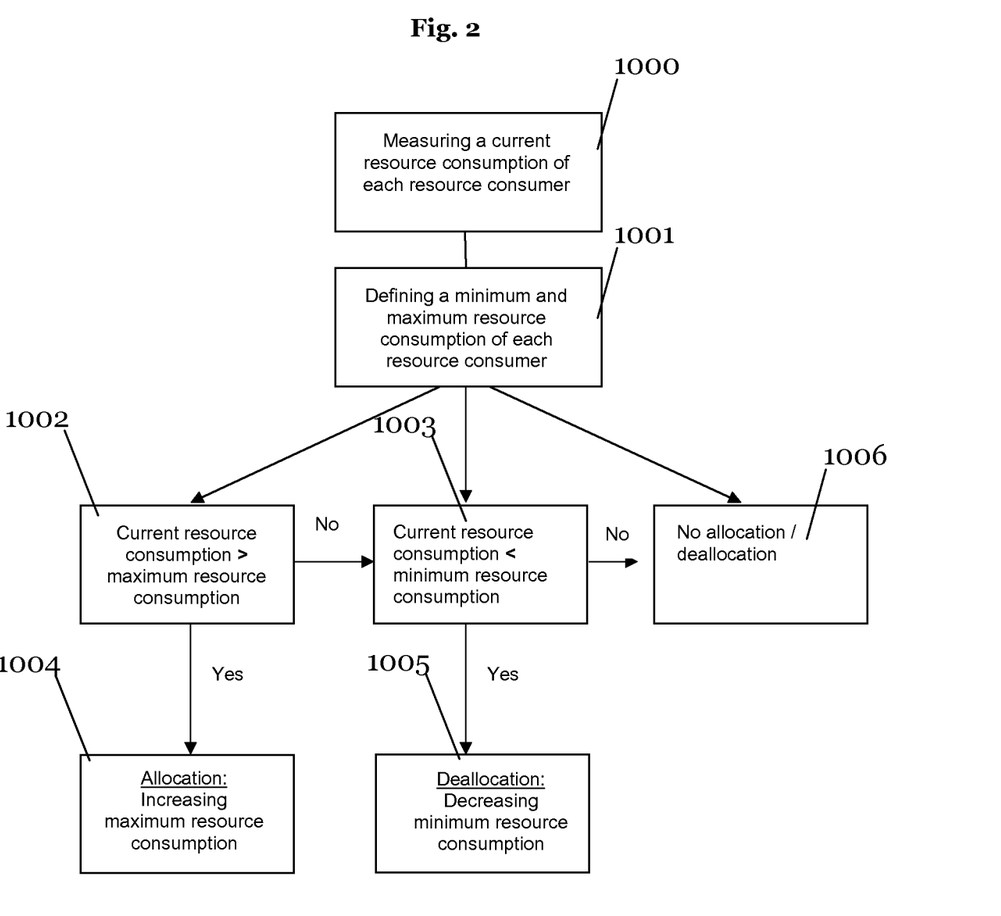
FIG. 2: A schematic workflow for allocating/deallocating resources in accordance with an embodiment of the present invention.

FIG. 2 illustrates a schematic workflow for allocating/deallocating resources 10 in accordance with one embodiment of the invention. In a first step, the current resource consumptions 24 are measured of each resource consumer 20, moo. Next, the minimum 26 and/or maximum resource consumptions 22 are defined for each resource consumer 20, preferably based on the maximal value of the current resource consumptions 24, 1001.

Allocation

If it is determined that the current resource consumption 24 exceeds the maximum resource consumption 22, 1002, an unutilized amount 12 of the resource 10 is calculated in accordance with the maximum resource consumption 22 and the current resource consumption 24. A portion or all of the unutilized amount 12 of the resource 10 is allocated to the resource consumers 20 who are in need 1004. The allocation is preferably performed on the basis of a distribution of the maximum resource consumptions 22 of the resource consumers 20 (see the example further below).

In the case of allocation, the resource consumer 20 is utilising more than the assigned resource 10, which is defined by the current and maximum resource consumptions 22, 24. Thus, the resource consumer 20 requires more resource 10 and is allocated to more resource 10 from the unutilized amount 12 of the resource 10.

Preferably, in this case the maximum resource consumption 22 is increased 1004. In particular, the maximum resource consumption 22 is doubled in a preferred embodiment of the invention. However, the value for increasing the thresholds is a variable and can be changed according to any requirements. Instead of doubling, any other values are possible.

Deallocation

If it is determined that the current resource consumption 24 is below the minimum resource consumption 26, 1003, a portion or all of the unutilized amount 12 of the resource 10 is deallocated from the resource consumer 20, 1005.

In the case of deallocation, the resource consumer 20 is underutilising the assigned resource 10, which is defined by the current and minimum resource consumptions 22, 26. In other words, the resource consumer 20 is only using a fraction of the resource 10 allocated to him. Thus, a portion of the allocated resource 10 is taken from him and put back to the unutilized amount 12 of the resource 10. The unutilized amount 12 of the resource 10 can then be distributed to the other resource consumers 20 who are in need or need more or to the regarded resource consumer 20 himself.

Preferably, the deallocation is considered, if a resource consumer 20 is not using the resource 10 and provides a way to lower the costs of maintaining physical servers.

Considering two resource consumers 20, each using two CPU cores, if the resource consumers 20 are wasting said resources 10, one core can be taken from each of the resource consumers 20, thereby cutting the respective power and decreasing the costs for electricity and cooling. In the case that all cores of the server are unutilized, then the physical server can be even shut down completely.

Preferably, in this case the minimum resource consumption 26 is decreased 1005. In particular, the minimum resource consumption 26 is decreased for example to the half in a preferred embodiment. However, the value for decreasing the thresholds is a variable and can be changed according to any requirements. Instead of dividing in half, any other values are possible.

No Allocation/Deallocation

In the case, that it is determined that the current resource consumption 24 is neither above the maximum resource consumption 22, nor below the minimum resource consumption 26, nothing is preferably done 1006. In other words neither the allocation, nor the deallocation is performed in this case 1006.

Overview of States

In one aspect of the invention, if the resource consumer 20 needs more resource 10, i.e. if the current resource consumption 24 exceeds the maximum resource consumption 22, more resource 10 is allocated to the resource consumer 20 for his needed state to finish the resource 10 usage as fast as possible, referred to as upscale state. Once the respective current resource consumption 24 falls below the minimum resource consumption 26, the allocated unutilized amount 12 of the resource 10 is taken back after waiting for some time to make sure the upscale state is finished, referred to as normal state. If the resource consumer 20 needs less resource 10, i.e. if the current resource consumption 24 falls below the minimum resource consumption 26, the resource 10 is deallocated from the resource 10, referred to as downscale state.

This concept can be considered as a cycle, wherein the resource consumers 20 switch from the normal state to the downscale state and/or the upscale state or from the downscale state and/or the upscale state to the normal state.

Example for Allocation/Deallocation of Resources

There are preferably two or more thresholds for determining if a normal state should be upscaled or downscaled.

In one aspect, two thresholds are used for allocating/deallocating, as shown in FIG. 2:

If the current resource consumption 24 is above the maximum resource consumption 22, the respective resource consumer 20 is given additional resource 10. If the current resource consumption 24 is below the minimum resource consumption 26, the respective resource consumer 20 is wasting resources 10 and thus said resources 10 are taken from the resource consumer 20.

Preferably, besides said two resource consumption thresholds, further thresholds can be defined for allocation/deallocation. For example a time resource consumption threshold for allocation/deallocation might be defined respectively. This threshold is essential to protect the system from sudden resource bursts. If there was no such threshold, then the system would go up and down for each command, thereby decreasing the stability of the system.

In this aspect, considering four thresholds, if the current resource consumption 24 is used more than the maximum resource consumption 22 for more than the maximum resource consumption time 32, the resource consumer 20 is allocated to more resource 10. If the current resource consumption 24 is used less than the minimum resource consumption 26 for more than the minimum resource consumption time 36, the resource consumer 20 is deallocated from the wasted resource 10. Accordingly for each resource 10, there are preferably four distinct thresholds.

Said thresholds can be considered as percentages. If an upscaled resource consumer 20 still consumes above the threshold, then it will be granted more resources 10 and so on.

Considering for example a server which has 2 GB of memory assigned to it, the maximum resource consumption 22 is 75% and the minimum resource consumption 26 is 35%. The maximum resource consumption time 32 and minimum resource consumption time 36 are each 5 seconds. If the server uses 500 MB of memory currently (more than 5 seconds), its maximum memory is decreased to 1 GB and the taken 1 GB can be given to another resource consumer 20. The given 700 MB value is between 35% and 75%, so the resource consumer 20 keeps its 1 GB max resource value. The server starts to get more memory and releases some so the value is not fixed at 700 MB but changes between 750 MB and 650 MB. However, as the value is not 750 for more then 5 seconds, the resource consumer 20 is not provided additional resources 10. Those thresholds prevent the allocation and deallocation of resources 10 for momentary spikes. The resource consumer 20 of the server starts another application and memory usage is increased to 800 MB. The moment the 5 second threshold is exceeded, the server receives an additional of 1 GB of memory, increasing the maximum memory resource from 1 GB to 2 GB. The application started is a memory extensive application and usage continually increases until the process is finally finished. Once the memory hits the 1.5 GB mark and stays around that point, the resource consumer 20 is allowed another 2 GB of memory increasing the maximum limit to 4 GB. The application finishes its operation around 3 GB and then the resource consumption again decreases to 700 MB and the maximum limit it has after 10 seconds is again 1 GB.

Furthermore, when deallocating a portion of the resource from a consumer, what is decreased in a preferred embodiment is the maximum amount of the resource it can use. For example, when the consumer uses 300 MB of memory, the maximum memory that can be allocated by the consumer (maximum resource available) is decreased from 2 GB to 1 GB. So the consumer can only take 1 GB of memory until the system recognizes the need and increase it to 2 GB again. As a side effect of this change, threshold values are also adjusted because they are percentage based. However the percentages are not changed, only the result of the calculation based on those percentages and $R_1$ is.

Moreover, consider a case where a physical server has 10 GB of RAM. There are two virtual servers on this physical server and they both have 4 GB of RAM. In this case, $R_t$ is 10 GB, $R_1$ and $R_2$ are 4 GB each and is 10−4−4=2 GB. $R_1$ and $R_2$ are not the current consumptions of consumers but maximum amount that can be consumed by the consumer. $T_1$ (tenant/virtual server who is assigned to $R_1$), has a consumption of 0.5 GB of memory ($C_1$). $C_1$ is below the minimum resource consumption threshold ($R_{min}$ which is 1 GB). As $C_1 < R_{min}$, the $R_1$ is halved to 2 GB. $R_1$ is changed and as a result is also changed to 10−2−4=4 GB. This is an increase of 2 GB (from 2 GB to 4 GB for $R_u$). Accordingly, $R_1$ is decreased therefore $R_u$ is increased.

Figure 6:
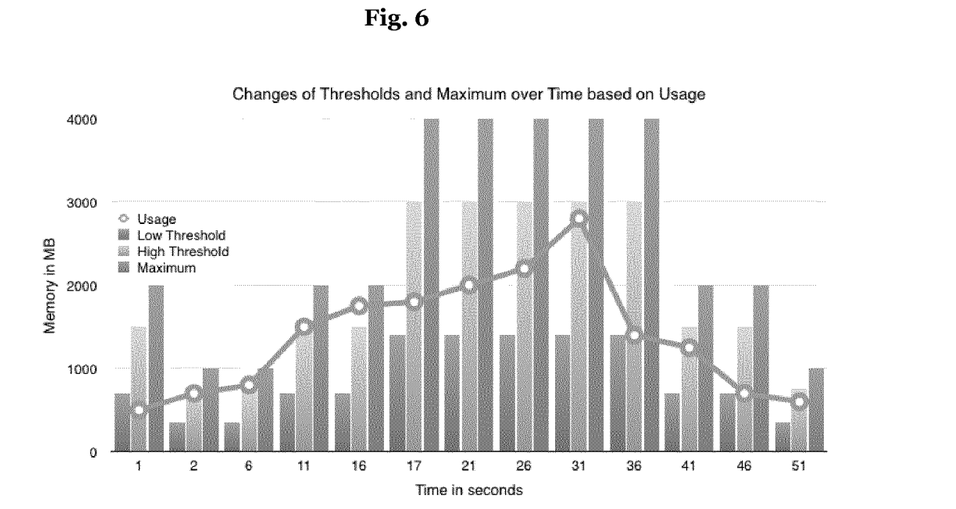
FIG. 6: Distribution of different maximum and minimum resource consumptions over time.

FIG. 6 shows an exemplary distribution of distinct thresholds over time depending on the resource usage.

Resource Sharing

In one embodiment, $R_t$ is all of the available resource 10 and this same resource 10 is allocated both to tenants 20 $T_1$ and $T_2$. The tenants 20 are equally referred to as resource consumers 20 in the following. Thus a method of sharing is defined as follows.

The consumption levels or current resource consumptions 24 of the tenants $T_1$ and $T_2$ are respectively $R_1$ and $R_2$, with $R_1 + R_2 <= R_t$. This is in contrast to the prior art, with $R_1 = R_2 = R_t/2$. This inequality still holds when $R_1 = R_t$ with $R_2 = 0$. Thus, $T_1$ can consume all the available resource 10, doubling it's performance. Preferably, for all values of $R_1$ or $R_2$, the other tenant 20 always has the opportunity to use all of the remaining resource 10. Worst case of this method appears when $T_1$ and $T_2$ races to full resource consumption. In this case, $R_1 = R_2 = R_t/2$, which is equal to the maximum performance of the prior art.

Figure 4:
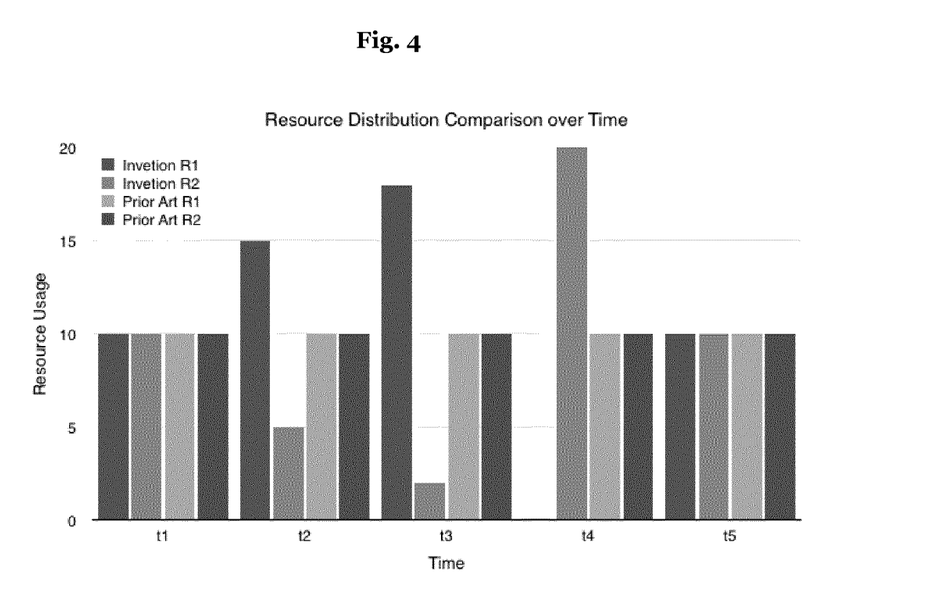
FIG. 4: Comparison of the distribution of resource consumptions of two resource consumers in accordance with an embodiment of the present invention with the prior art.

FIG. 4 provides a comparison of the resource distribution of the present invention with the prior art over time.

Further, the number of tenants 20 sharing the resource 10 is not limited. For example $R_1 + R_2 + R_3 <= R_t$ and when $T_1$, $T_2$ and $T_3$ races to full resource consumption 10, the standard case of the prior art becomes the worst case of the present invention as $R_1 + R_2 + R_3 = R_t/3$.

Capping

Moreover, to enhance and control this sharing, capping is introduced. Tenants 20 have their own promised share of resource 10. The promised resource P is related to the configuration given to the resource consumer 20.

In the prior art, such as Xen, the resource consumer is promised for a single VCPU and nothing more. The resource consumer 20 is not taken from the resource 10, if the resource consumer 20 does not use it well nor given more if it uses more than it currently has.

Considering a case where there are two resource consumers 20, the present invention promises both resource consumers 20 a single VCPU at least. However, if one of the resource consumers 20 is not using its VCPU to full extent and the other resource consumer 20 requires more, the resource consumer 20 in need is allowed to use the underutilized resource, increasing its allocated resource 10 to 1.5 VCPU. Once the other resource consumer 20 starts using the VCPU on the other hand, both of the resource consumers 20 get 1 VCPU at least, thereby keeping the promise and the best case scenario of the prior art (which is the invention's worst case).

Any usage below P is shared to the other tenants 20 who need such resource 10. Referring to the following table, in this example scenario, there are three tenants 20, $T_1$, $T_2$ and $T_3$ with promised resources 22 of $P_1$=40, $P_2$=40 and $P_3$=20. Total resource 10, $R_t$=100. Excess usage, E(i) is calculated by:

$$E(i) = \begin{cases} R_i - P_i, & R_i > P_i \\ 0, & \text{otherwise} \end{cases}$$

The following table lists the above explained values, $R_t$, E(i) for each tenant $T_1$-$T_3$ in columns 1-3 and the sum $\Sigma(P_n - R_n)$ and sum $\Sigma(P_n - R_n)$ in columns in columns 4 and 5 for each time tick t1-t5, in respective rows.

|    | T1 |      | T2 |      | T3 |      |                  |              |
|----|----|------|----|------|----|------|------------------|--------------|
|    | R1 | E(1) | R2 | E(2) | R3 | E(3) | $\Sigma(Pn - Rn)$ | $\Sigma(Rn)$ |
| t1 | 40 | 0    | 40 | 0    | 10 | 0    | 10               | 90           |
| t2 | 45 | 5    | 40 | 0    | 10 | 0    | 5                | 95           |
| t3 | 50 | 10   | 40 | 0    | 10 | 0    | 0                | 100          |
| t4 | 45 | 5    | 45 | 5    | 10 | 0    | 0                | 100          |
| t5 | 0  | 0    | 67 | 27   | 33 | 13   | 0                | 100          |

Descriptions of each time tick, t are:

$t_1$ $T_1$ and $T_2$ both consume all of their promised resources $P_1$ and $P_2$, while $T_3$ is consuming half of its promised resource using only 50% of its allocated 20, thus 10). The value 10 indicating the unutilized amount 12 of the resource 10 is listed in the fourth column, $\Sigma(P_n-R_n)$.

$t_2$ $T_1$ needed 5 more and 10 was available from $T_3$ so this unused resource can be assigned to $T_1$, letting it to consume 45. Note that available resource is now 10−5=5.

$t_3$ $T_1$ needed 5 more, again. As 5 is available, that is assigned to $T_1$.

$t_4$ $T_2$ needed 10 more, but as there are no resources to handle this request, tenants using more than their promised resources have to reshare the available resource 10 with the same promise rate. Excess usage was 10; tenants 20 that need to share this excess resource are $T_1$ and $T_2$. Remember that $P_1$=$P_2$, so this excess is shared equally. $T_1$'s extra is down from 10 to 5, where this 5 is given to $T_2$, which makes it 45, instead of 50.

$T_5$ $T_1$'s usage dropped to 0, but $T_2$ and $T_3$ requested more resources. Their promise rates are not equal ($P_2$=40 and $P_3$=20) so they'll share the 40 using same rate, getting 27 and 13 more.

$$40 \frac{40}{40+20} \cong 27$$

$$40 \frac{20}{40+20} \cong 13$$

Figure 5:
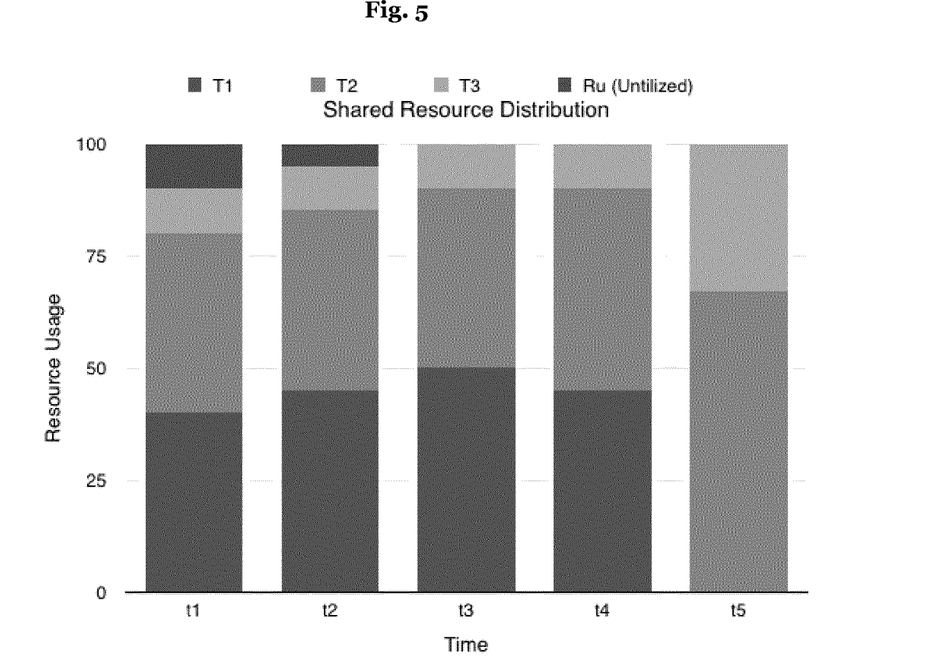
FIG. 5: Comparison of the distribution of resource consumptions of two resource consumers in accordance with an embodiment of the present invention with the prior art.

FIG. 5 shows how the invention distributes the resources 10 in one embodiment considering the resource consumer's 20 cap and usage.

The following formula defines the maximum amount of the resource 10 resource consumer $T_n$ can consumer, $Z_n$:

$$Z_n = P_n + R_u$$

The unutilized amount 12 of the resource 10, $R_u$, is defined as:

$$R_u = R_t - \Sigma(R_n) \text{ with } n=1 \text{ to } H$$

The above listed table is extended with the values Z and $R_u$, as follows:

|    | T1 |      |    | T2 |      |    | T3 |      |    |       |              |
|----|----|------|----|----|------|----|----|------|----|-------|--------------|
|    | R1 | E(1) | Z1 | R2 | E(2) | Z2 | R3 | E(3) | Z3 | $R_u$ | $\Sigma(R_n)$ |
| t1 | 40 | 0    | 50 | 40 | 0    | 50 | 10 | 0    | 30 | 10    | 90           |
| t2 | 45 | 5    | 50 | 40 | 0    | 45 | 10 | 0    | 25 | 5     | 95           |
| t3 | 50 | 10   | 50 | 40 | 0    | 40 | 10 | 0    | 20 | 0     | 100          |
| t4 | 45 | 5    | 45 | 45 | 5    | 45 | 10 | 0    | 20 | 0     | 100          |
| t5 | 0  | 0    | 40 | 67 | 27   | 67 | 33 | 13   | 33 | 0     | 100          |

In case of $Z_t > R_t$, the following resource 10 allocation methodology is used to fulfill $P_n$. $Z_t$ is defined as the total amount of resource 10 that can be consumed by resource consumers 20, considering the promise/cap plus the excess. As the excess can be assigned to any resource consumer 20, the excess value is used more than once to calculate $Z_t$. In this case, $Z_t$ can exceed $R_t$. Considering $t_2$, $Z_t$ is 120 since $R_3$ is underutilized and there is still 5 unit of R available to be used by any tenant.

Overview of Resources

CPU

Preferably, the distinct resources, such as CPU, are all handled similarly in terms of threshold and resource allocation/deallocation. However, there might be still some differences. While a single CPU set can be assigned to two different resource consumers 20 and giving them priorities, the same cannot be told for disk and memory. It's not possible for a single bit in use by a resource consumer to be used by another. In the case of CPU, however, the other resource consumer 20 just waits its turn to execute a command. The impossibility of allocated disk and memory sharing is the key point in dynamic allocation. With the dynamic allocation/deallocation concept, unused resources 10 can be given to other resource consumers 20.

The calculation of a CPUs usage might be more complicated in comparison to other resources, such as memory and disk. The CPU usage is mostly for a short duration of time. A CPU set (or core) which 100% a microsecond ago, can be 10% after another microsecond. This variation creates a difficulty calculating short term sparks and real need of constant computation power. Another problem is to effective selection of a core set to be assigned. In a cloud environment 1, more then a single resource consumer 20 is being served on the actual physical server and two server (or tenant in this case) at the same time can require additional resources 10. Consider a resource consumer 20 is using CPU cores with index number 1 and 2 and if another resource consumer 20 uses 3 and 4. If the first resource consumer 20 requires additional CPU power (cores), cores with index 5 and 6 should be assigned to it, instead of 3 and 4. Thus selection of the CPU core that will be allocated to the resource consumer 20 in need also becomes an optimization problem in turn.

Memory and disk space on the other hand are different. Selection of memory and bit locations closes to the current tenant's recourse is already done in the OS level. While selection of a busy CPU will cause a performance problem while there are CPU cores which are available, each bit in memory is accessed at constant time in the OS level, which is as much optimized as possible.

The resource CPU is explained in more detail in the following:
Th$_{ch}$ CPU High Usage Threshold
Th$_{cl}$ CPU Low Usage Threshold
Tm$_{ch}$ CPU High Usage Time
Tm$_{cl}$ CPU Low Usage Time The CPU sharing methodology needs more detail, as this technique is not only about allocating spare resources 10 to parties 20 who need them. It is also about sharing under-utilized resources 10.

The following methodology is used to modify the subscription of the tenants 20 to the CPUs:

$$Modify(h) = \begin{cases} -1, & \text{unsubscribe} \\ 0, & \text{keepsubs} \\ 1, & \text{subscribe} \end{cases}$$

$$Sb(h) = \prod_{t=1}^{T} Cth_{max}(U_{ht})$$

$$Us(h) = \prod_{t=1}^{T} Cth_{min}(U_{ht})$$

$$Cth_{max}(x) = \begin{cases} 0, & \text{otherwise} \\ 1, & \frac{\delta U_{ht}}{\delta U_{h(t-1)}} > Th_{max} \end{cases}$$

$$Cth_{min}(x) = \begin{cases} 1, & \frac{\delta U_{ht}}{\delta U_{h(t-1)}} > Th_{min} \\ 0, & \text{otherwise} \end{cases}$$

Where U is cycle counts, h is a tenant, H is a set of tenants.

To choose the most suitable CPU among all available CPUs, following method is utilized. The basic metric used is the idleness of the CPU. Find n by $$C(I_n) = 1/T \sum_{t=1}^{T} \frac{\delta I_{nt}}{\delta I_{n(t-1)}}, \text{ maximize}(C(I_n)),$$

subject to n∈N

Where n is the CPU, t is the observation number, T is total number of idle cycle observations, I$_{nt}$ is the number of idle cycles of CPU n at time t, N is the total number of CPUs available.

Memory
Th$_{mh}$ Memory High Usage Threshold
Th$_{ml}$ Memory Low Usage Threshold
Tm$_{mh}$ Memory High Usage Time
Tm$_{ml}$ Memory Low Usage Time
Disk I/O
Th$_{ih}$ Disk I/O High Usage Threshold
Th$_{il}$ Disk I/O Low Usage Threshold
Tm$_{ih}$ Disk I/O High Usage Time
Tm$_{il}$ Disk I/O Low Usage Time
Disk Space
Th$_{dh}$, Disk Space High Usage Threshold
Th$_{dl}$ Disk Space Low Usage Threshold
Tm$_{dh}$ Disk Space High Usage Time
Tm$_{dl}$ Disk Space Low Usage Time
Global Network Bandwidth
Th$_{gh}$ Global High Usage Threshold
Th$_{gl}$ Global Low Usage Threshold
Tm$_{gh}$ Global High Usage Time
Tm$_{gl}$ Global Low Usage Time
Network I/O
Th$_{nh}$ Global High Usage Threshold
Th$_{nl}$ Global Low Usage Threshold
Tm$_{nh}$ Global High Usage Time
Tm$_{nl}$ Global Low Usage Time
Example Use Case Infrastructure as a Service providers dedicate a set of computing resources 10 and the related ecosystem such as but not limited to, network, data storage, data communication, power, cooling services to interested parties with a promise of handling all Infrastructural challenges and problems which may affect those interested parties 20. The problem is under-utilization of such already-dedicated resources 10.

As mentioned above, the prior art is partitioning those resources 10 and assigning those partitions to the service users 20. An example could be, partitioning a physical server by using virtualization solutions and rent such partitions, which utilizes such resource 10 better than only using a physical server.

The advantages of the present invention over the prior art are preferably differentiated into several categories. Those categories are: Resource Allocation, Cost Efficiency, Performance Increase and Energy Efficiency.

Hardware is still expensive for high-powered physical servers. Allocation of resources 10, such as CPU or memory, is not handled well with current systems. Most of the resource consumers 20 who buy resources 10 are not using them, as they should. Such raw computing power is wasted on resource consumers 20. Dynamic allocation of such resources 10 will provide a cost effective way for every customer 20 who needs computer power at some hours and not that much for the rest of the way.

Figure 3:
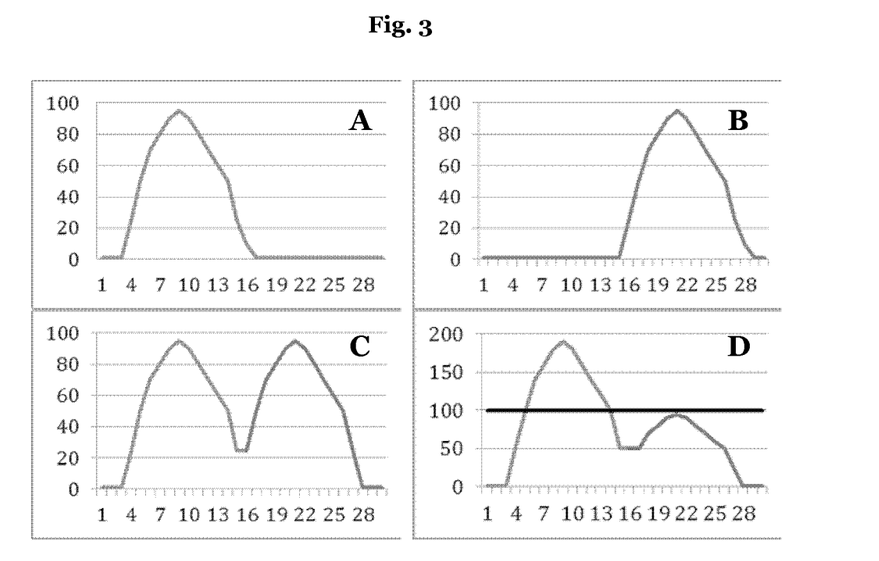
FIGS. 3A-D: Schematic representations of two resource consumers sharing a resource, CPU server, in accordance with an embodiment of the present invention.

As shown in FIGS. 3A-D, two resource consumers 20 T$_1$ and T$_2$ are in different time zones, for example in Europe (Zone 1) and U.S.A (Zone 2) and require the same performance during mornings. FIG. 3A shows the CPU usage for the resource consumer 20 T$_1$ in Zone 1 and FIG. 3B shows for resource consumer 20 T$_2$ in Zone 2. Accordingly, the resource consumers 20 can share a single server 10, as shown in a combined graph in FIGS. 3C and 3D. The dynamic allocation of resources 10 in the present invention makes such cases possible.

Contrary, as resources 10 are allocated statically to customers in the prior art, they have to pay for those resources 10 even if they do not use or they do not need them. The present invention enables to dynamically increase the resources 10 of a tenant 20 when there is an actual need and decreasing those resources 10 when there is no need.

This way, the customers' costs are decreased. Further, performance of servers is increased as the resources 10 can be added to the servers during high load situations. With more resources 10 comes better performance.

Moreover, computer hardware uses a lot of electricity and energy. Even though that hardware is improved in time to use less energy, the best option to save on energy is not to use them at all. As in the previously described situation, each of these two customers 20 require a physical server however with dynamic resource 10 allocation method, they can share the same physical server which is a great improvement on energy consumption.

SUMMARY

This invention is to be used by "cloud hosting" providers, mainly on infrastructure as a service component. The motivation behind the idea is to get better utilization of under-utilized resources 10, thus performance gain, or in other words, under-utilized resources 10 by other tenants 20 can be enabled for tenants 20 who are in need.

Contrary to the present invention, the prior art is partitioning resources 10 (of a server) and assigning those partitions to the service users 20. An example could be, partitioning a physical server by using virtualization solutions and rent such partitions; which utilizes such resource 10 better than only using a physical server. An example would be, a 2 CPU server is used by 2 tenants 20. The application of the applicant goes beyond that, examines how such resources are used and without noticeable performance loss, ensures that the tenant 20 receives the same (or more) performance when they need it. When not needed, those resources 10 are used by the tenants 20 in need. A 2 CPU server can be used by more than two tenants 20.

In the prior art, N tenants 20 are disadvantageously hosted on a M CPU host and thus a tenant can only utilize 1 CPU. Contrary, in the present invention, a single tenant 20 can go up to M CPU, given that those CPUs are underutilized.

Other disadvantages of the prior art include cost and energy deficiency because a lot more resources 10 are consumed with the prior technique. The present invention allows to simply serve more tenants 20 with the same resources 10. In other words, the resources 10/energy consumed is reduced to serve the same number of tenants 20.

According to the above, with 1 CPU, N tenants 20 can be served who rarely need that resource 10, which means, most of the time they'll be idle.

The prior art is about creating smaller servers from a server with vast resources 10. Preferably, the present invention does not use a layer between the resource and the VM, which is commonly referred to as hypervisor. The overhead of using a hypervisor is eliminated as one advantage. The present invention is about sharing resources 10 so that more performance can be utilized from the same hardware. Tenants 20 (applications) can only see the resources 20 they have access to so this part similar to the previous art.

The idea opens following possibilities:
1. Serving more users 20 by utilizing the same resources 10
2. Serving same number of users 20 with less resources 10
3. Serving same number of users 20 where they will practically have more performance To enable such uses, usage monitoring is absolutely necessary and tenants 20 needs to be partitioned according to their usage.

The invention claimed is:

1. A computer-implemented method for allocating at least one resource to a plurality of resource consumers in a cloud computing environment, wherein the method comprises the following steps:
   a. defining a maximum resource consumption for each of the plurality of resource consumers;
   b. measuring a current resource consumption of each of the plurality of resource consumers;
   c. calculating based on the maximum resource consumptions and the current resource consumptions an unutilized amount of the at least one resource;
   d. allocating at least a portion of the unutilized amount of the at least one resource to the plurality of resource consumers;
   e. defining a maximum resource consumption time and a minimum resource consumption time for each of the plurality of resource consumers and measuring a current resource consumption time of each of the plurality of resource consumers, wherein the maximum resource consumption time and the minimum resource consumption time define a maximum and minimum time span, respectively, in which a consumer has access to the at least one resource; and
   f. increasing the maximum resource consumption of at least one resource consumer, if the current resource consumption of the at least one resource consumer exceeds the maximum resource consumption of the at least one resource consumer longer than the maximum resource consumption time of the at least one resource consumer.

2. The method of claim 1, wherein the allocating at least a portion of the unutilized amount of the at least one resource to the plurality of resource consumers is based on a distribution of the maximum resource consumptions of the plurality of resource consumers.

3. The method of claim 1, wherein the at least one resource is selected from the group comprising: CPU, memory, disk I/O, disk space, network bandwidth and / or network I/O.

4. The method of claim 1, wherein the method further comprises the step of defining a minimum resource consumption for each of the plurality of resource consumers.

5. The method of claim 4, wherein the method further comprises the steps of calculating based on the minimum resource consumption and the current resource consumption of a resource consumer an unutilized amount of the at least one resource; and deallocating at least a portion of the unutilized amount from the resource consumer.

6. The method of claim 4, wherein the method further comprises the step of decreasing the minimum resource consumption of at least one resource consumer, if the current resource consumption of the at least one resource consumer falls below the minimum resource consumption of the at least one resource consumer longer than the minimum resource consumption time of the at least one resource consumer.

7. A non-transitory computer readable medium comprising computer executable instructions that, when executed by a processor, cause the processor to perform the method in accordance with claim 1.

8. A system for allocating at least one resource to a plurality of resource consumers in a cloud computing environment, wherein the system comprises a processor and memory and computer executable instructions stored in the memory and executable by the processor, wherein when the instructions are executed by the processor cause the processor to:
   a. define a maximum resource consumption for each of the plurality of resource consumers;
   b. measure a current resource consumption of each of the plurality of resource consumers;
   c. calculate based on the maximum resource consumptions and the current resource consumptions an unutilized amount of the at least one resource;
   d. allocate at least a portion of the unutilized amount of the at least one resource to the plurality of resource consumers;
   e. define a maximum resource consumption time and a minimum resource consumption time for each of the plurality of resource consumers and measuring a current resource consumption time of each of the plurality of resource consumers, wherein the maximum resource consumption time and the minimum resource consumption time define a maximum and minimum time span, respectively, in which a consumer has access to the at least one resource; and f. increase the maximum resource consumption of at least one resource consumer, if the current resource consumption of the at least one resource consumer exceeds the maximum resource consumption of the at least one resource consumer longer than the maximum resource consumption time of the at least one resource consumer.

9. The system of claim 8, wherein the system operates based on a distribution of the maximum resource consumptions of the plurality of resource consumers.

10. The system of claim 8, wherein the computer executable instructions, when executed by the processor, cause the processor to define a minimum resource consumption for each of the plurality of resource consumers.

11. The system of claim 10, wherein the computer executable instructions, when executed by the processor, cause the processor to calculate based on the minimum resource consumption and the current resource consumption of a resource consumer an unutilized amount of the at least one resource; and deallocate at least a portion of the unutilized amount from the resource consumer.

\* \* \* \* \*